United States Patent
Xu (10) Patent No.: US 7,489,693 B2
(45) Date of Patent: Feb. 10, 2009

(54) METHOD AND APPARATUS FOR AUTOMATICALLY DETECTING VIRTUAL CIRCUIT SETTINGS AND ENCAPSULATION TYPES IN A DSL NETWORK

(75) Inventor: Haibo Xu, Carlsbad, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1081 days.

(21) Appl. No.: 10/245,982

(22) Filed: Sep. 18, 2002

(65) Prior Publication Data
US 2004/0052263 A1 Mar. 18, 2004

(51) Int. Cl.
*H04L 12/28* (2006.01)
*H04L 12/56* (2006.01)

(52) U.S. Cl. .............. 370/395.5; 370/465; 370/466; 370/338; 370/255; 370/469; 370/231; 370/252; 370/467; 370/254; 370/389; 370/392; 370/395.1; 370/395.52; 370/400; 370/409

(58) Field of Classification Search ............. None
See application file for complete search history.

(56) References Cited

U.S. PATENT DOCUMENTS

| | | | | |
|---|---|---|---|---|
| 6,253,327 B1 * | 6/2001 | Zhang et al. | .................. | 726/14 |
| 6,477,595 B1 * | 11/2002 | Cohen et al. | ................. | 710/105 |
| 6,711,162 B1 * | 3/2004 | Ortega et al. | ................. | 370/389 |
| 6,975,597 B1 * | 12/2005 | Baker et al. | .................. | 370/255 |
| 6,993,010 B1 * | 1/2006 | Peshkin | ........................ | 370/352 |
| 2001/0034759 A1 * | 10/2001 | Chiles et al. | ................. | 709/203 |
| 2003/0037163 A1 * | 2/2003 | Kitada et al. | ................. | 709/236 |
| 2003/0078999 A1 * | 4/2003 | Lund et al. | .................. | 709/220 |

OTHER PUBLICATIONS

G. Gross, et al.; Network Working Group Request for Comments: 2364; .PPP Over AAL5; Jul. 1998; pp. 1-12.
L. Mamakos, et al.; Network Working Group Request for Comments: 2516; A Method for Transmitting PPP Over Ethernet (PPPoE); Feb. 1999; pp. 17.
W. Simpson; Network Working Group Request for Comments: 1661; The Point-to-Point Protocol (PPP); Jul. 1994; pp. i-ii, 1-52.
Internet website; OAM on ATM Interfaces FAQ's; pp. 1-9; www.cisco.com/warp/public/121/oamfaq.html.

* cited by examiner

*Primary Examiner*—Chi H Pham
*Assistant Examiner*—Raj K Jain
(74) *Attorney, Agent, or Firm*—Thomas, Kayden, Horstemeyer & Risley, LLP (57) ABSTRACT

Automatic detection of the virtual circuit setting and encapsulation type of a DSL line. A DSL modem determines the correct virtual path identifier (VPI) and virtual channel identifier (VCI) by sending OAM loopback requests to different VPI/VCI pairs until a valid loopback reply is received. PPPoA encapsulation is detected when a valid reply is received to a PPP LCP configuration request or echo request. PPPoE encapsulation is detected when a valid reply is received to a PPP LCP termination request or a PPPoE discovery offer (a PADO packet) is received in response to a PPPoE discovery initiation request (a PADI packet).

6 Claims, 6 Drawing Sheets

METHOD AND APPARATUS FOR AUTOMATICALLY DETECTING VIRTUAL CIRCUIT SETTINGS AND ENCAPSULATION TYPES IN A DSL NETWORK

FIELD OF THE INVENTION

The present invention relates to DSL networks and, more particularly, relates to automatic detection of the virtual circuit settings and encapsulation type being used on a DSL line.

BACKGROUND OF THE INVENTION

Digital subscriber line (DSL) technology permits high-speed data transmission and Internet connectivity over conventional copper telephone lines. Conventional POTS ("Plain Old Telephone Service") telephone lines were constructed to transmit human voice signals having a frequency range of 0-3.4 kHz. This is only a small fraction, however, of the bandwidth that can be supported by a copper wire. DSL technology uses this excessive available bandwidth for high-speed transmission of data. One of the more commonly used forms of DSL is asymmetric DSL (ADSL). ADSL recognizes the fact that most Internet users receive (download) much more information than they send (upload), and reserves the majority of the available channels for downstream transmission. A typical ADSL system provides downstream bit rates of up to 9 Mbps and upstream bit rates of up to 1 Mbps.

In conventional DSL networks, a virtual circuit for data transmission is established between a customer premises equipment (CPE) modem and a central office (CO) modem. A virtual circuit is a communications link that appears to the user to be a dedicated point-to-point circuit. It is identified by two numbers: the VPI (virtual channel identifier) and VCI (virtual channel identifier). When a customer first installs and initializes a CPE modem, the first information that is needed is the permanent virtual circuit settings that the CPE modem will need to communicate with the CO modem. In known configurations, the VPI/VCI identifiers are either pre-configured in the modem or are provided to the user who must manually enter the numbers. It would be desirable if the CPE modem could automatically sense and determine the correct VPI/VCI settings upon initial installation and initialization of the modem.

In addition to establishing a virtual circuit between the CPE modem and CO modem, a protocol defining the rules for sending and receiving information over the circuit must be established. In the ISO (International Organization for Standards) model, which defines a layered division of communications between applications on two computers or hosts, this type of protocol is known as a data link layer (layer 2) protocol. The point-to-point protocol (PPP), as defined in RFC 1661, is a popular data link layer protocol for connecting hosts by phone line. PPP provides a method for transmitting data over serial point-to-point links and has three main components: a method for encapsulating data; a link control protocol (LCP) for establishing, configuring and testing the data link connection; and a family of network control protocols (NCPs) for establishing and configuring different network layer protocols.

A PPP frame or packet, once formed, is itself encapsulated or framed for transport over the DSL network. Two encapsulation methods are of particular importance to DSL: PPP over Ethernet (PPPoE) and PPP over ATM (PPPoA). The encapsulation type that will be used, as with the virtual circuit settings, is typically programmed in or must be manually entered in the CPE modem at initialization. It would be advantageous if the CPE modem could automatically detect the type of encapsulation being used on its associated DSL line.

SUMMARY OF THE INVENTION

One embodiment of the invention is a DSL modem having means for automatically detecting the correct virtual circuit settings when the modem is connected to a DSL line, and means for automatically detecting the encapsulation type being used on the DSL line.

Another embodiment of the invention is operating software for a DSL modem that detects the correct virtual circuit settings of a connected DSL line by sending loopback requests over different virtual circuits until a valid loopback reply is received.

Another embodiment of the invention is operating software for a DSL modem that determines that the encapsulation type being used by a connected DSL line is PPPoA when a valid reply is received in response to a PPP/LCP configuration or echo request; and determines that the encapsulation type is PPPoE when a valid reply is received in response to a PPPoE discovery initiation request or a PPP/LCP termination request.

Another embodiment of the invention is a computer readable medium having computer executable instructions for automatically detecting the correct DSL virtual circuit setting and encapsulation type. The correct virtual circuit setting is detected by sending loopback requests over different virtual circuit settings until a valid loopback reply is received. PPPoA encapsulation is detected when a reply to a PPP/LCP configuration request or echo request is received. PPPoE encapsulation is detected when a reply to a PPP/LCP termination request or a PPPoE discovery initiation request is received.

Another embodiment of the invention is a method for determining the correct virtual circuit settings for a DSL modem. The method comprises the steps of choosing a virtual circuit setting and sending a loopback request over the chosen virtual circuit setting. If a reply to the loopback request is received, the chosen virtual circuit setting is stored as the correct virtual circuit setting. If a reply to the loopback request is not received, different virtual circuit settings are chosen and loopback requests sent until a reply is received.

Another embodiment of the invention is a method for determining whether a DSL line is using PPPoA encapsulation. PPP/LCP configure-request and echo-request packets are sent over the line. If replies to either are received, the encapsulation type is stored as PPPoA.

Another embodiment of the invention is a method for determining whether a DSL line is using PPPoE encapsulation. A PPPoE fast connect recovery command and PADI packet are sent over the line. If a reply to either is received, the encapsulation type is stored as PPPoE.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
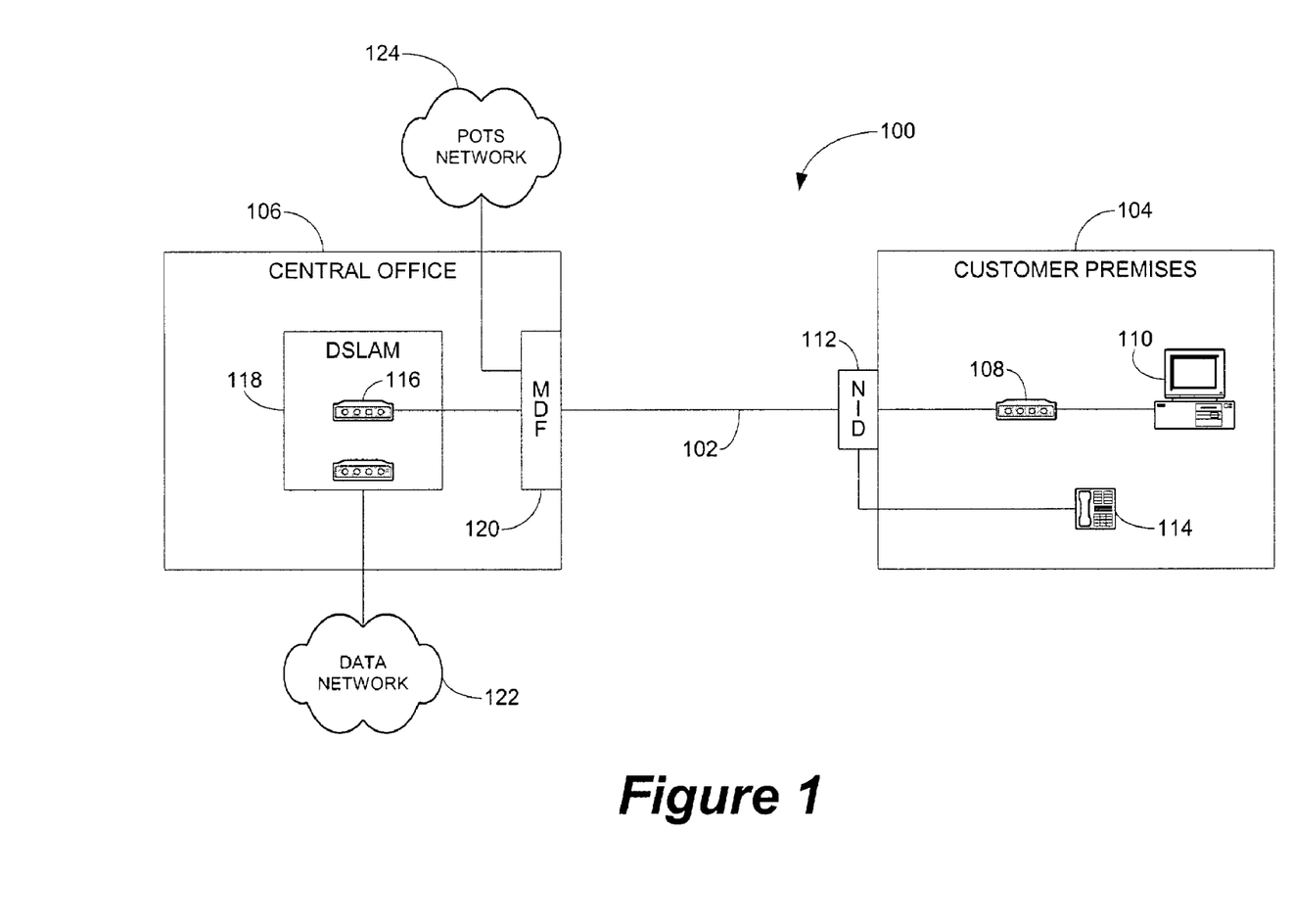
FIG. 1 is a block diagram illustrating a typical DSL network.

FIG. 1 is a block diagram of a typical DSL network 100. Alternate network configurations are possible, but an exemplary network is described in order to illustrate the environment in which the present invention is used. Subscriber loop 102, which is typically a POTS copper loop pair, carries traffic between a customer premises (CP) 104 and a telephone company "central office" (CO) 106. Central office 106 is a telephone company facility or other DSL service provider that manages multiple subscriber loops. A customer premises equipment (CPE) modem 108 is located within customer premises 104 and conveys DSL data signals to and from loop 102. In an ADSL context, CPE modem 108 may be referred to as an ATU-R ("ADSL Transmission Unit-Remote"). CPE modem 108 is connected to one or more computers 110, servers or other customer equipment via an appropriate interface, such as an Ethernet interface. CPE modem 108 demodulates signals received from CO 106 via loop 102 and provides the demodulated signals to computer 110, and modulates signals from computer 110 to be transmitted over loop 102 to CO 106.

A network interface device (NID) 112 may optionally be deployed between subscriber loop 102 and the wiring inside customer premises 104 in order to isolate the customer's equipment from the telephone company network. NID 112 is typically placed at the side of the customer's home. Where a NID is used, it will typically contain a splitter or filter to segregate the signal received over loop 102 between CPE modem 108 and one or more standard telephones or other POTS equipment 114. The lower voice band frequencies are passed to telephones 114 while the higher frequency data signals are passed to CPE modem 108. Alternatively, in a "splitterless" configuration, a NID is not utilized and CPE modem 108 connects directly to loop 102. Low pass filters are connected to telephones 114 to admit only the POTS voice signal. A splitterless configuration is advantageous in that installation can typically be done by the customer and no visit from a technician for NID installation is required.

CO modem 116 terminates the end of the ADSL link opposite CPE modem 108 and is located within CO 106. In an ADSL context, CO modem 116 may be referred to as an ATU-C ("ADSL Transmission Unit-Central Office"). CO modem 116 is typically one of a bank of modems contained within a DSL access multiplexer (DSLAM) 118 in CO 106. DSLAM 118 connects to multiple subscriber loops 102 via main distribution frame (MDF) 120. DSLAM 118, with its bank of CO modems, connects the subscriber loops, via appropriate switchers and routers, to outside broadband data networks 122, such as the Internet. CO 106 also provides access to narrowband voice/analog networks 124, such as the public switched telephone network (PSTN), to facilitate transmission of POTS signals over subscriber loops 102.

Figure 2:
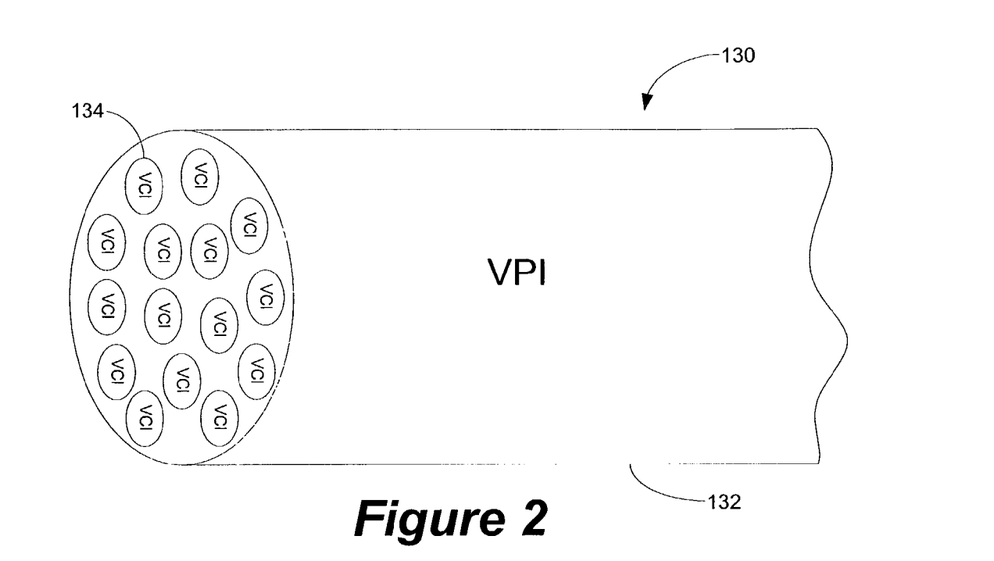
FIG. 2 is a conceptual illustration of a virtual circuit.

In conventional DSL networks, a virtual circuit for data transmission is established between customer premises 104 and central office 106. A virtual circuit is a communications link that appears to the user to be a dedicated point-to-point circuit. Most networks in use today use permanent virtual circuits (PVCs), as opposed to switched virtual circuits (SVCs). A PVC is a fixed network path between nodes on a network (in the case of a DSL system, the CPE modem and CO modem) that is always available. A PVC is typically identified by two numerical fields: a virtual path identifier (VPI) and a virtual channel identifier (VCI). FIG. 2 is a conceptualization of a permanent virtual circuit 130. Virtual path 132 can be thought of as a pipe, identified by a VPI, containing a plurality of virtual channels 134, each of which is identified by a unique VCI. Thus, permanent virtual circuit 130 is described by two identifiers: a VPI indicating the virtual path 132; and a VCI indicating the virtual channel 134 within that path.

When a customer first installs and initializes a CPE modem, the first information that is needed is the permanent virtual circuit settings that the CPE modem needs to communicate with the CO modem. Without knowledge of the VPI/VCI identifiers, a virtual circuit cannot be established for data exchange. In known configurations, the VPI/VCI identifiers are either pre-configured in the CPE modem or are provided to the user who must manually enter the numbers.

The present invention provides a virtual circuit autosense feature for automatically identifying the correct virtual circuit settings upon initial installation and initialization of the CPE modem. Key to identification of the virtual circuit settings is a "loopback request", which is a diagnostic test method whereby a loopback request received by a receiving peer (in the present invention, a CO modem) is replicated and retransmitted to the sending peer (in the present invention, a CPE modem). In one implementation, the loopback request is an OAM (Operations, Administration and Maintenance) loopback request as specified in ITU (International Telecommunications Union) specification number ITU-T I.610. The intended usage for an OAM loopback request is to determine whether a DSL loop is working properly. In accordance with the present invention, the loopback request is used in a manner to determine the virtual circuit VPI and VCI numbers.

Figure 3:
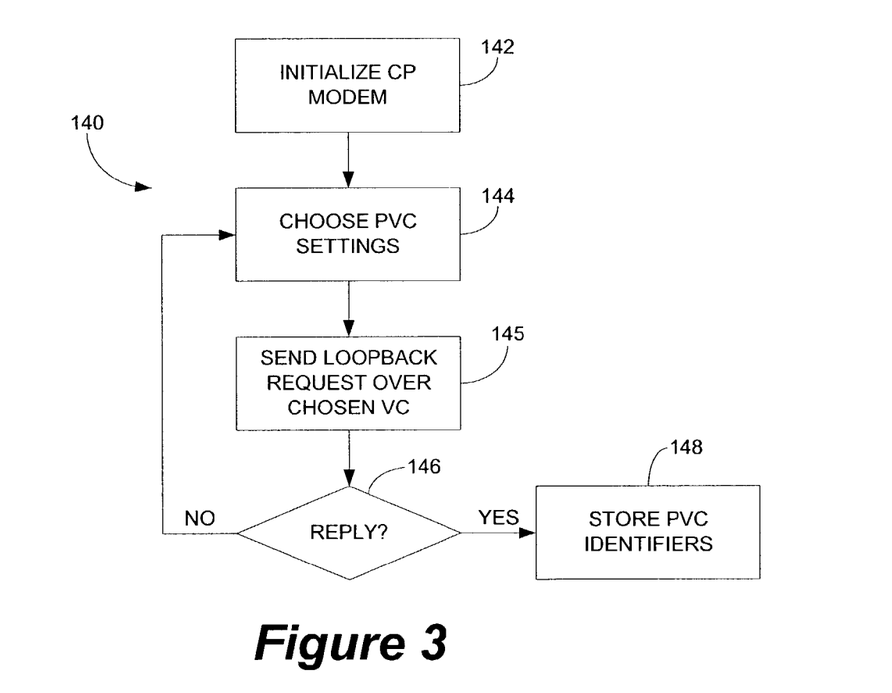
FIG. 3 is a flow diagram illustrating a method for identifying virtual circuit settings.

Essentially, OAM loopback requests are sent over potentially correct virtual circuits settings until a valid reply is received, indicating that the virtual circuit settings are correct. FIG. 3 is a flow diagram illustrating a method 140 for determining the virtual circuit settings. In step 142, a CPE modem is installed and initialized at the customer premises. In step 144, the settings for a potentially operative virtual circuit are chosen. As described, the virtual circuit is identified by a VPI/VCI pair. In some circumstances, the modem manufacturer or ISP may have identified particular VPI/VCI numbers that are most likely to work. In such circumstances, step 144 preferably begins with the virtual circuit identifiers most likely to be correct.

In step 145, a loopback request is sent using the chosen virtual circuit settings. In one implementation, the request is an OAM F5 loopback request. As will be described with reference to FIG. 4, the loopback request is implemented by sending an OAM loopback cell 150 containing the chosen VPI/VCI identifiers. Step 146 determines whether a valid reply to the loopback request has been received. A valid reply takes the form of a replica of the loopback cell that was sent in step 145. Steps 145 and 146 may be repeated several times for each VPI/VCI pair. If a valid reply has been received, the correct virtual circuit has been identified and the corresponding VPI/VCI identifiers are stored (step 148). Hence, method 140 needs to be carried out only the first time that the modem is turned on. Subsequent sessions simply use the stored VPI/VCI identifiers. If a valid reply was not received, indicating that the VPI/VCI pair was incorrect, the method returns to step 144 to choose a new VPI/VCI pair. Again, if likely virtual circuit identifiers are known, these are tried first.

Figure 4:
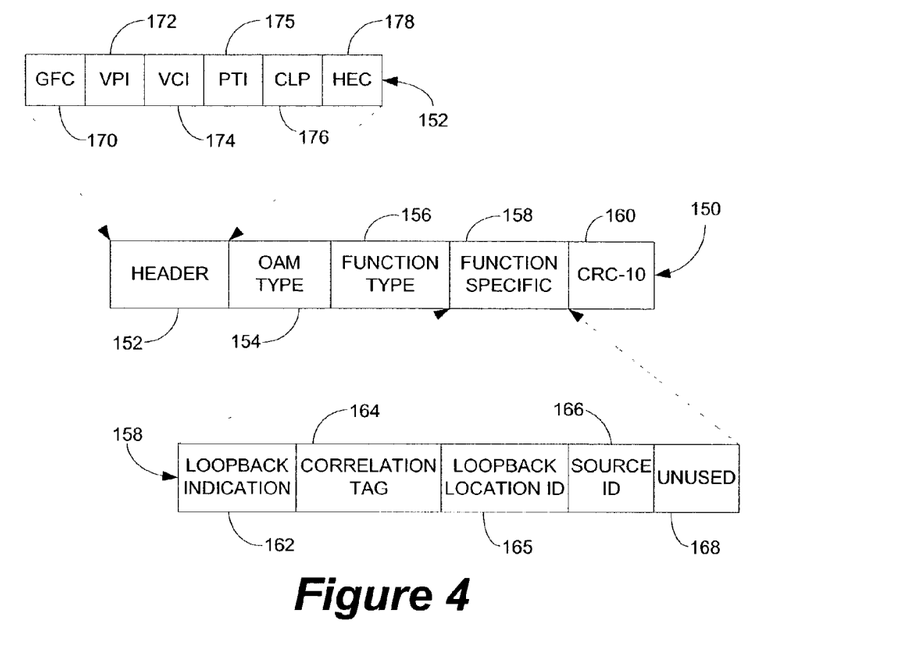
FIG. 4 is a diagram illustrating an OAM loopback cell.

FIG. 4 depicts an OAM loopback cell 150 formatted in accordance with ITU-T I.610. Other loopback cell implementations are possible and are within the scope of the present invention. Loopback cell 150 implements the loopback request of method 140. Loopback cell 150 comprises header field 152, OAM type field 154, function type field 156, function specific field 158 and CRC-10 field 160.

Header field 152 is a standard, 5-byte ATM cell header comprising GFC field 170; VPI field 172; VCI field 174; PTI field 175; CLP field 176; and HEC field 178. GFC (generic flow control) field 170 is a four-bit field for implementing flow control functions. VPI (virtual path identifier) field 172 is an eight-bit field identifying the virtual path over which cell 150 should be sent. VCI (virtual channel identifier) field 174 is a sixteen-bit field identifying the virtual channel over which cell 150 should be sent. Hence, the VPI/VCI identifiers chosen in method step 144 are inserted into VPI field 172 and VCI field 174. PTI (payload type identification) field 175 is a three-bit field distinguishing the various types of ATM management and user cells. CLP (cell loss priority) field 176 is one bit indicating two levels of priority for ATM cells (0=higher priority; 1=lower priority). HEC (header error control) field 178 is the last byte of the header and is used for checking header integrity.

OAM type field 154 is a four-bit field indicating the cell's management function, such as fault management (0001), performance management (0010) or activation/deactivation (1000). Loopback is a fault management function, so field 154 would be set to "0001" to implement method 140. Function type field 156 is a four-bit field indicating the actual function performed by the cell. Field 156 is set to "1000" for cell loopback. Again, it is noted that these particular settings, as well as the loopback cell format in general, are simply that which is specified in ITU-T I.610 and are not critical to the present invention. CRC-10 field 160 is a ten-bit cyclic redundancy check field that detects errors in all bits of cell 150 except for field 160 itself.

Function specific field 158 is a 45-byte field containing the body of the message. Field 158 has a unique format for each cell/function type. FIG. 4 depicts the format for a loopback cell. Loopback location indication field 162 is an eight-bit field. The first bit of field 162 is set to zero or one depending on the direction: it is set to one for outgoing command cells, and is changed to zero for incoming response cells. In method 140, the first bit of field 162 is set to one in step 145 when the loopback request is sent, and is changed to zero in step 146 when a response cell is received. Correlation tag field 164 matches outgoing command cells with associated incoming response cells. Loopback location ID field 165 identifies the VC segment where loopback is to occur, and source ID field 166 identifies the source of a loopback cell.

In one implementation of method 140, a CPE modem sends a loopback cell 150 over a DSL line, with VPI field 172 and VCI field 174 set as discussed with respect to method 140. If a replica of cell 150 is received in response, the VPI/VCI settings contained in cell 150 are the correct settings and are stored. If a reply is not received, a loopback cell with different VPI/VCI settings is sent and the method is repeated.

In addition to establishing a virtual circuit between the CPE modem and CO modem, a protocol defining the rules for sending and receiving information over the circuit must be established. In the ISO (International Organization for Standards) model, which defines a layered division of communications between applications on two computers or hosts, this type of protocol is known as a data link layer (layer 2) protocol. The point-to-point protocol (PPP), as defined in RFC 1661, is a popular data linke layer protocol for connecting hosts by phone line. PPP provides a method for transmitting data over serial point-to-point links and has three main components: a method for encapsulating data; a link control protocol (LCP) for establishing, configuring and testing the data link connection; and a family of network control protocols (NCPs) for establishing and configuring different network layer protocols.

Figure 5:
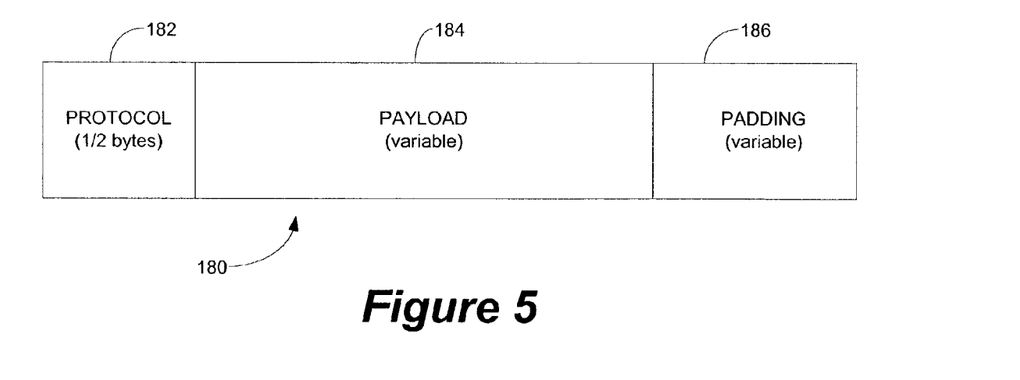
FIG. 5 is a diagram illustrating the PPP frame format.

A PPP frame 180 formatted in accordance with RFC 1661 is illustrated in FIG. 5. Protocol field 182 is one or two bytes in length and contains a value that identifies the data encapsulated in payload field 184. Payload field 184 is a variable number of bytes in length and contains the data to be transmitted. A padding field 186 having an arbitrary length may also be provided.

PPP frame 180, in turn, must be encapsulated or framed for transport over the DSL network. Two encapsulation methods are of particular importance to DSL: PPP over Ethernet (PPPoE) and PPP over ATM (PPPoA). The encapsulation type that will be used, as with the VPI/VCI identifiers, is typically not known and must be programmed or manually entered into the CPE modem at initialization. The present invention provides an encapsulation autosense feature that automatically identifies the type of encapsulation being used on a particular DSL line. Before describing the encapsulation autosense feature, one implementation of each encapsulation (PPPoE and PPPoA) format will be briefly described. It is important to note, however, that alternate implementations of the PPPoE and PPPoA protocols may be employed and are within the scope of the present invention.

In many access technologies, the most cost effective method for attaching multiple hosts to the customer premises equipment is via Ethernet. PPPoE, defined in RFC 2516, is a protocol for encapsulating PPP frames in Ethernet frames. Many Internet service providers use PPPoE to provide residential DSL broadband Internet access. To provide a point-to-point connection over Ethernet, the first step is a discovery stage in which each peer learns the MAC (medium access control) address of the other peer, and in which a unique session identifier is established. This discovery stage uses specially formatted PPPoE packets.

To initiate discovery, a PPPoE client sends a PPPoE active discovery initiation (PADI) packet to the broadcast Ethernet address. When an access concentrator receives a PADI packet, if it is willing to set up a session, it sends a PPPoE active discovery offer (PADO) packet to the unicast Ethernet address of the client that sent the PADI packet.

Since there can be more than one access concentrator within the broadcast range of the client, it may receive more than one PADO packet in response to its PADI packet. The client picks the access concentrator with which it would like to start a session, and sends a PPPoE active discovery request (PADR) packet to the unicast Ethernet address of the access concentrator. If the access concentrator agrees to set up a session, it assigns a unique session number and sends this number to the client in a PPPoE active discovery session-confirmation (PADS) packet.

Figure 6:
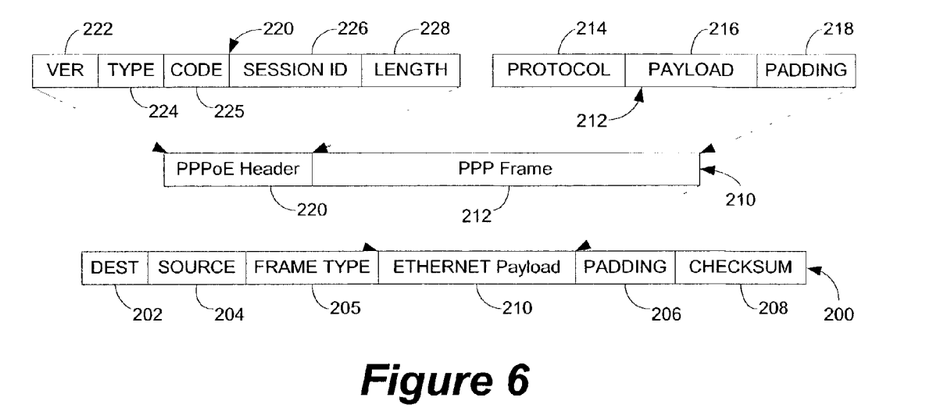
FIG. 6 is a diagram illustrating the PPPoE protocol format.

Once each side knows the other's Ethernet address and a session number has been established, a PPPoE session can begin. PPPoE session frames consist of PPP frames encapsulated within Ethernet frames. A PPPoE frame 200 formatted in accordance with RFC 2516 is illustrated in FIG. 6. Other PPPoE frame formats are possible and are within the scope of the present invention. PPPoE frame 200 is an Ethernet frame in which the payload 210 is a PPP frame 212 with a PPPoE header 220. As described with respect to FIG. 5, PPP frame 212 includes a protocol field 214, a payload field 216 and an optional padding field 218. PPPoE header 220 comprises four-bit version field 222 (set to 0x1 for the current version of PPPoE (RFC 2516)); four-bit type field 224 (set to 0x1 for the current version of PPPoE (RFC 2516)); an eight-bit code field 225 (set to 0x00 for the session stage and various values for the different discovery frame types); a sixteen-bit session ID field 226 containing the session ID number established during the discovery stage; and a sixteen-bit length field 228 indicating the length of PPP frame 212.

PPPoE frame 200, in addition to payload 210, has an Ethernet header including destination field 202, source field 204 and frame type field 205. Destination field 202 contains a unicast Ethernet address in the session stage and either a unicast or broadcast address in the discovery stage. Source field 204 contains the unicast Ethernet address of the source (CPE) device. Ethernet frame type field 205 is set to 0x8863 for the discovery stage and to 0x8864 for the session stage. PPPoE frame 200 may also include a padding field 206 and a checksum field 208.

Figure 7:
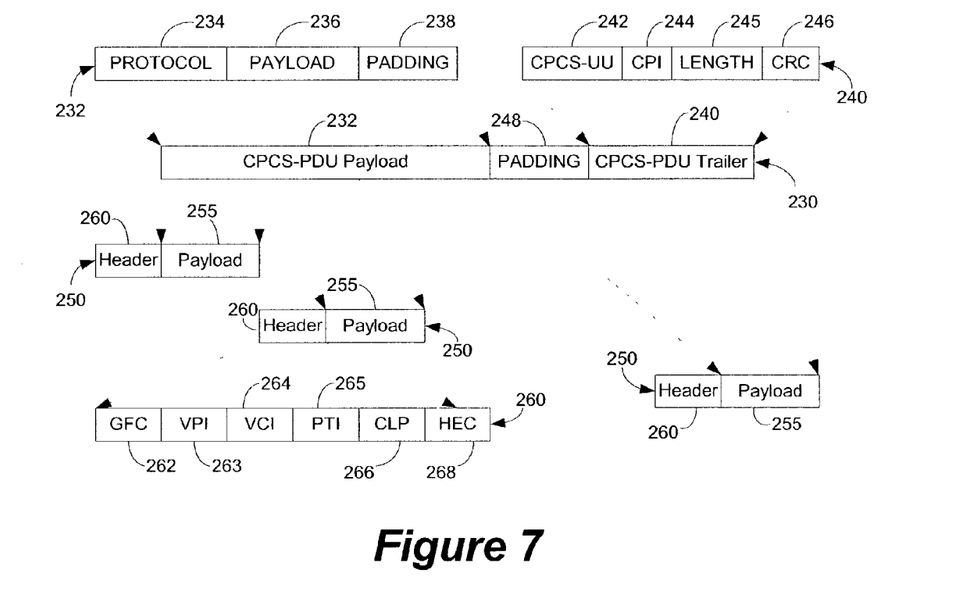
FIG. 7 is a diagram illustrating the PPPoA protocol format.

PPPoA is an alternative encapsulation method to PPPoE. PPPoA is defined in RFC 2364 and governs the use of the PPP protocol over a DSL access circuit running the ATM protocol. ATM adaptation layer 5 (AAL5) is used to frame PPP encapsulated packets, and the AAL5 frame or "protocol data unit" (PDU) is then segmented into ATM cells for transport over a DSL line or reassembled from ATM cells received over a DSL line. FIG. 7 illustrates a PPPoA frame 230 formatted and segmented into ATM cells 250 in accordance with RFC 2364. Other PPPoA frame formats are possible and are within the scope of the present invention. PPPoA frame 230 is an AAL5 frame in which the payload 232 is a PPP frame having a protocol field 234, a payload field 236 and an optional padding field 238 (as previously described). Payload 232 may also be referred to as a CPCS-PDU (common part convergence sublayer-protocol data unit) payload, and may have a length of 0-65,535 bytes.

PPPoA frame 230 also includes a trailer 240 and padding field 248. Trailer 240 includes one-byte CPCS-UU (user-to-user indication) field 242 which is used to transparently transfer user-to-user information; one-byte CPI (common part indicator) field 244 which is used to align trailer 240 to 64 bits; two-byte length field 245 indicating the length of payload field 232; and four-byte CRC (cyclic redundancy check) field 246.

PPPoA frame (or CPCS-PDU) 230 is segmented into or reassembled from a plurality of 48-byte ATM payloads 255 to which are attached 5-byte ATM headers 260 to form a plurality of 53-byte ATM cells 250. Padding field 248 pads frame 230 to fit exactly into ATM cells 250 such that the last 48-byte payload 255 created will have trailer 240 right-justified in the cell. The fields of ATM header 260 are the same as described with respect to FIG. 4: GFC field 262; VPI field 263; VCI field 264; PTI field 265; CLP field 266; and HEC field 268.

Figure 8:
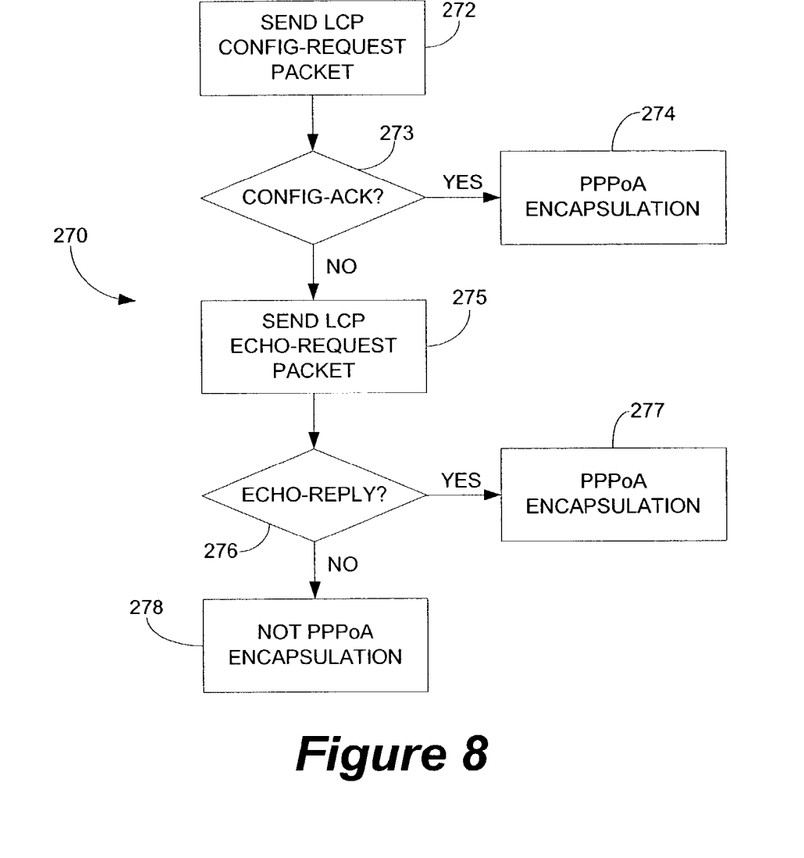
FIG. 8 is a flow diagram illustrating a method for determining whether a DSL network is using PPPoA encapsulation.

FIG. 8 is a flow diagram illustrating a method 270 for determining whether a DSL network is using PPPoA encapsulation. In one embodiment of the present invention, method 270 is carried out after method 140 (FIG. 3) has identified the virtual circuit settings of the DSL line. Method 270 utilizes two types of link control protocol (LCP) packets recognized under the PPPoA protocol: configure-request packets and echo-request packets. Before proceeding with the description of method 270, the general format of LCP packets will be described.

Figure 9:
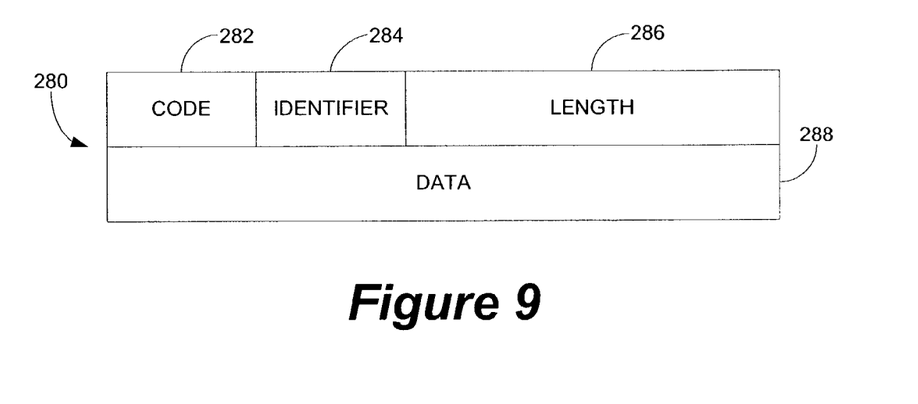
FIG. 9 is a diagram illustrating the format of a LCP packet.

FIG. 9 is a diagram illustrating the format of a LCP packet 280 under RFC 1661. Again, alternate formats may be used and still fall within the scope of the present invention. Both configure-request packets and echo-request packets are formatted as set forth in FIG. 9. Packet 280 includes code field 282; identifier field 284; length field 286; and data field 284. Code field 282 is a one-byte field that identifies the kind of LCP packet (i.e., configure-request, echo-request and so on). Identifier field 284 is a one-byte field that aids in matching requests and replies. Length field 286 is a two-byte field that indicates the length of the LCP packet, including the code, identifier, length and data fields. Data field 288 is a field having a length of zero or more bytes, as indicated by the length field, and having a format determined by the code field.

Exactly one LCP packet 280 is encapsulated in the payload of a PPP frame. With reference to FIG. 5, packet 280 is encapsulated in payload 184 of PPP frame 180. Protocol field 182 is set to hex c021 to indicate that payload 184 contains a LCP packet. With reference to FIG. 7, PPP frame 180 (containing encapsulated LCP packet 280) is encapsulated in payload 232 of a PPPoA frame 230, which is then segmented into individual ATM cells 250 and sent from the CPE modem to the CO modem.

Referring again to FIG. 8, in step 272, a LCP configure-request packet is sent from the CPE modem to the CO modem along the identified virtual circuit. LCP configure-request packets are intended for use by a CPE modem that wishes to open a connection. In one implementation, the LCP configure-request packet is configured as packet 280 in FIG. 9, with code field 282 set to "1" for configure-request, and data field 288 containing a list of zero or more configuration options that the sender desires to negotiate. Since the CPE modem is not actually attempting to negotiate a connection, but rather, is seeking only to determine whether PPPoA encapsulation is being used, the exact content of data field 288 is not important. In one implementation, field 288 contains the most widely supported configuration options.

Under the PPP LCP, a CO modem receiving a configure-request packet must transmit an appropriate reply. Hence, if some form of configuration reply packet is received (step 273), the CPE modem knows that PPPoA encapsulation is being used (step 274) since the configuration request was understood by the CO. In most circumstances, where all options and values in the configure-request packet are acceptable to the CO, a configure-ack packet will be sent in response. A configure-ack packet is essentially a replica of the configure-request packet, except that code field 282 is set to "2". However, even if there is a problem with the configure-request packet and a configure-nak or configure-reject packet is received in response, this in itself is still enough to indicate to the CPE modem that the request was understood and hence that the encapsulation type is PPPoA.

If no reply to the configure-request packet is received, in step 275, the CPE modem sends a LCP echo-request packet. The echo-request packet is a link management packet that is intended as an aid for debugging or testing an already-opened link. Method 270 uses an echo-request packet to address the scenario where there is a brief line loss after the configure-request packet is sent in step 272. For example, a modem user may accidentally or intentionally power a modem off after its initial powering on, and subsequently power it on again. Or, there may be a very brief line loss or severe noise in the line. While this may seem to be an innocuous event, it can (without step 275) prevent the CPE modem from properly ascertaining whether PPPoA encapsulation is being used.

When the CPE modem is initially powered on, a configure-request packet is sent in step 272. A CO modem may receive the configure-request packet and send a configure-reply packet in response. If the CPE modem loses its connection immediately after sending its configure-request packet, however, the configure-reply packet sent by the CO modem may not be received (since the CPE modem lost its connection). Hence, the CPE modem still has not determined the encapsulation type. If the CPE modem quickly tries to re-establish a connection, the line loss may not have yet registered at the CO. This is because a server typically has a timeout period, which may last several minutes or longer, during which it continues to act as if there is a connection, even though none exists. When step 272 is repeated, the CO will refuse to answer the configure-request packet because it is operating as if there is already a connection (because of the first configure-request). Hence, on the second attempt to establish a line, no reply will be received to the configure-request, potentially leading to an incorrect determination that PPPoA encapsulation is not being used.

The use of an echo-request packet in step 275 addresses this potential problem. If the server is in a timeout period because of the aforementioned scenario, it will still be required to send an echo-reply packet in response to an echo-request packet (since it believes there is an open connection). If an echo-reply packet is received (step 276), the CPE modem has confirmed that PPPoA encapsulation is being used (step 277). The echo-request and echo-reply packets take the form of packet 280 in FIG. 9, with code field 282 being set to "9" for echo-request and "10" for echo-reply. If no reply packets are received in response to either the configure-request or echo-request packets, the CPE modem concludes that PPPoA encapsulation is not being used (step 278).

Steps 272/273 (configure-request) and 275/276 (echo-request) may be performed in reverse order, if desired. That is, an echo-request packet may be sent initially to address the timeout scenario. If an echo-reply is received, the CPE modem knows that PPPoA encapsulation is being used. If no echo-reply is received, the CPE modem sends out a configure-request packet. Additionally (and preferably), the configure-request and echo-request packets can be sent out simultaneously or in either order, in rapid succession, and multiple times in order to minimize response time. A valid reply to any of the sent packets will indicate PPPoA encapsulation.

This novel use of configure-request and echo-request packets to determine whether PPPoA encapsulation is being used is further advantageous in that the method may be used before the user has set up his ISP account and billing information, or has received an ID and password required to establish a connection. The configure-request and echo-request packets do not require this information. So, the CPE modem can determine the encapsulation type without having established an actual PPP session.

Figure 10:
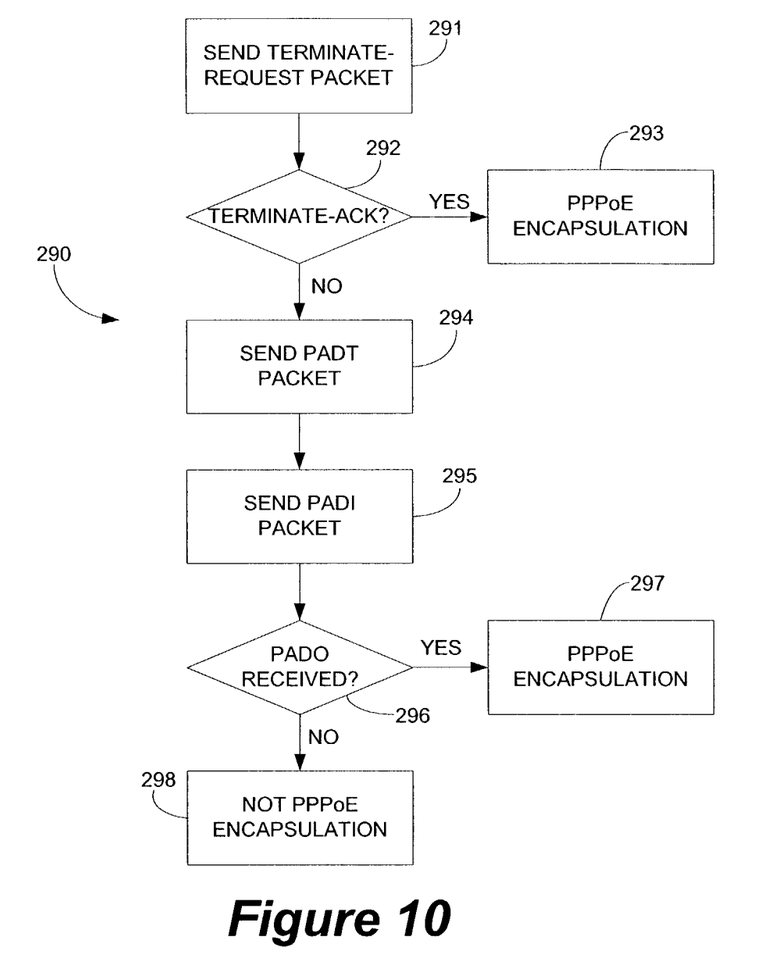
FIG. 10 is a flow diagram illustrating a method for determining whether a DSL network is using PPPoE encapsulation.

FIG. 10 is a flow diagram illustrating a method 290 for determining whether a DSL network is using PPPoE encapsulation. Method 290 for sensing PPPoE encapsulation is conceptually very similar to method 270 for sensing PPPoA encapsulation. Method 290 may be carried out after method 140 (FIG. 3) has identified the virtual circuit settings, and may be carried out before, after or concurrently with method 270 for detecting PPPoA encapsulation. Method 290 utilizes LCP terminate-request packets under the PPP protocol as well as PADT and PADI discovery packets under the PPPoE protocol.

As in PPPoA detection, the scenario of a lost connection leading to a timeout at the CO-side must be addressed. The present invention provides a function which has been termed "fast connect recovery" under which information about the last successful connection is saved in the CPE modem's memory. In step 291, a LCP terminate-request packet is sent from the CPE modem to the CO modem using this stored information. LCP terminate-request packets provide a mechanism for closing (and re-establishing) an open connection. The LCP terminate-request packet is configured as packet 280 in FIG. 9, with code field 282 set to "5" for terminate-request. The terminate-request packet, in turn, is encapsulated along with a PPPoE header within an Ethernet frame, as described with reference to FIG. 6.

Under the PPP LCP, a CO modem receiving a terminate-request packet must transmit a terminate-ack packet in response. Hence, if a terminate-ack packet is received (step 292), the CPE modem knows that PPPoE encapsulation is being used (step 293) since the PPPoE-encapsulated terminate-request was understood by the CO. If a terminate-ack packet is not received, in step 294, a PADT (PPPoE Active Discovery Terminate) packet is sent. A PADT packet is defined under the discovery stage of the PPPoE protocol and serves to make sure that, if a connection did exist, it is terminated. With reference to FIG. 6, for any Ethernet discovery packet, including PADT packets, frame type field 205 is set to 0x8863. For a PADT packet, destination field 202 is set using the address information stored in the CPE modem from the last connection. Code field 225 of the PPPoE header is set to 0xa7. Finally, although other types of discovery packets use TAGs (FIG. 11), no TAG is required for a PADT packet.

Together, the use of a PPP/LCP terminate packet (step 291) and a PPPoE PADT packet (step 294) comprises "fast connect recovery"—the CO modem is told to disconnect any connections that it thinks exists and prepare to accept a new connection. Moreover, if a PPPoE terminate-ack packet is received during this process, the CPE modem knows that PPPoE encapsulation is being used and the method needs to go no further. In step 295, after fast connect recovery, the CPE modem sends a PADI (PPPoE Active Discovery Initiation) packet. For a PADI packet, destination field 202 is set to the broadcast address, code field 225 is set to 0x09 and the session ID field 226 is set 0x0000.

Figure 11:
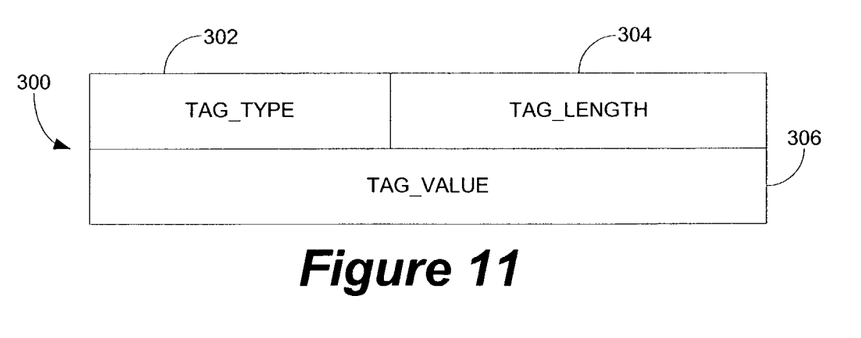
FIG. 11 is a diagram illustrating the format of a PPPoE discovery packet.

In one implementation, payload field 216 of the PADI packet must contain at least one TAG. A TAG 300 formatted as set forth in RFC 1661 is illustrated in FIG. 11. TAG 300 includes a sixteen-bit TAG_TYPE field 302 and a sixteen-bit TAG_LENGTH field 304 indicating the length in bytes of TAG_VALUE field 306.

When a CO server receives a PADI that it can serve, it must reply by sending a PADO packet. In one PPPoE implementation, destination field 202 of the PADO packet is the address of the CPE modem that sent the PADI, code field 225 is set to 0x07 and session ID field 226 is set to 0x0000. It contains a TAG 300 indicating the CO server's name, as well as a duplicate of the TAG received in the PADI. If a PADO packet is received (step 296), the CPE modem has confirmed that PPPoE encapsulation is being used (step 297). If neither a PADO packet or a termination-ack packet is received in response to either the PADI or terminate-request packets, the CPE modem concludes that PPPoE encapsulation is not being used (step 298).

Steps 291-294 (fast connect recovery) and 295-297 (PADI) may be performed in any order or simultaneously, in rapid succession, and multiple times in order to minimize response time. A valid reply to any of the sent packets will indicate PPPoE encapsulation. As with PPPoA detection, the use of these packets is advantageous as no established account or password information is required.

The methods of the present invention used to determine the virtual circuit settings and encapsulation types are implemented by software residing in the CPE modem or in a computer operating the modem. The software is preferably configurable and is written in a software language known to those of ordinary skill in the art, such as "C".

While various embodiments of the invention have been described, it will be apparent to those of ordinary skill in the art that many more embodiments and implementations are possible that are within the scope of this invention. Similar methods may be used, for example, to detect encapsulation types other than PPPoA and PPPoE.

What is claimed is:

1. A method for determining whether a DSL line (digital subscriber line) is using PPPoA (point-to-point protocol over asynchronous transfer mode) encapsulation comprising:

sending a PPP/LCP (point-to-point protocol/link control protocol) configure-request packet;

if a reply to the sent configure-request packet is received, storing the encapsulation type as PPPoA;

sending a PPP/LCP echo-request packet; and if a reply to the sent echo-request packet is received, storing the encapsulation type as PPPoA, wherein the PPP/LCP configure-request and echo-request packets are sent simultaneously.

2. A method as claimed in claim 1, wherein the reply to the configure-request packet is a PPP/LCP configure-ack packet, configure-nak packet or configure-reject packet.

3. A method as claimed in claim 1, wherein the reply to the echo-request packet is a PPP/LCP echo-reply packet.

4. A method as claimed in claim 1, wherein configure-request and echo-request packets are sent rapidly and alternately for a pre-determined time period or until a reply to either a configure-request packet or echo-request packet is received.

5. A method as claimed in claim 1, wherein the method is carried out by software residing in a DSL modem.

6. A method as claimed in claim 1, wherein if any reply to the sent configure-request packet is received, determining the encapsulation type as PPPoA.

* * * * *